US 6,726,591 B2

(12) United States Patent
Maruyama et al.

(10) Patent No.: US 6,726,591 B2
(45) Date of Patent: Apr. 27, 2004

(54) FOUR-WHEEL DRIVE SYSTEM FOR VEHICLES

(75) Inventors: Taiji Maruyama, Wako (JP); Tetsurou Hamada, Wako (JP); Kanji Kita, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/194,325

(22) Filed: Jul. 15, 2002

(65) Prior Publication Data
US 2003/0024753 A1 Feb. 6, 2003

(30) Foreign Application Priority Data

| Aug. 2, 2001 | (JP) | ........................................ 2001-234972 |
| Aug. 2, 2001 | (JP) | ........................................ 2001-235462 |
| Nov. 28, 2001 | (JP) | ........................................ 2001-361928 |

(51) Int. Cl.$^7$ ............................................ B60K 17/346
(52) U.S. Cl. ....................................... 475/330; 180/248
(58) Field of Search ................................ 180/248, 249, 180/250, 233; 475/221, 329, 330

(56) References Cited

U.S. PATENT DOCUMENTS

| 4,589,304 A | * | 5/1986 | Ashikawa et al. | .......... 475/225 |
| 4,967,861 A | * | 11/1990 | Oyama et al. | .............. 180/233 |
| 4,969,532 A | * | 11/1990 | Oyama et al. | .............. 180/233 |

FOREIGN PATENT DOCUMENTS

| JP | 2615086 | 3/1997 |
| JP | 2621680 | 4/1997 |
| JP | 10-288248 | 10/1998 |
| JP | 3047016 | 3/2000 |
| JP | 2000-108704 | 4/2000 |

* cited by examiner

*Primary Examiner*—Kevin Hurley
(74) *Attorney, Agent, or Firm*—Armstrong, Kratz, Quintos, Hanson & Brooks, LLP (57) ABSTRACT

The four-wheel drive system for vehicles has a center differential mechanism that divides the rotational driving force from the engine E between the front and rear wheels, and a front wheel side axle differential mechanism that divides this divided rotational driving force between the left and right front wheels. The center differential mechanism is constructed from a single pinion type first planetary gear device which has a first carrier 13 that receives the rotational driving force from the engine E, a first sun gear 11, and a first ring gear 14 that is connected to the rear wheel side, and the axle differential mechanism is constructed from a double pinion type second planetary gear device which has a second ring gear 24 that is connected to the first sun gear 11, a second sun gear 21 that is connected to the right front wheel, and a second carrier 23 that is connected to the left front wheel. The first and second planetary gear devices are disposed adjacent to each other in a coaxial configuration.

16 Claims, 7 Drawing Sheets

FOUR-WHEEL DRIVE SYSTEM FOR VEHICLES

FIELD OF THE INVENTION

The present invention relates to a four-wheel drive system for vehicles which rotationally drives all four wheels of a vehicle by transmitting a rotational driving force from a driving source (engine or the like) to the front wheels and rear wheels, and more particularly relates to a four-wheel drive system for vehicles which is constructed so that the rotational driving force from the driving source is divided and transmitted to the front and rear wheels via a center differential mechanism.

BACKGROUND OF THE INVENTION

Four-wheel drive vehicles in which both the front wheels and rear wheels are driven have been generally known in the past, and four-wheel drive vehicles in which a center differential mechanism is installed between the front wheels and rear wheels, and the vehicle is constructed so that the rotational driving force of the engine is divided and transmitted to the front and rear wheels via a center differential mechanism, are also known. In such four-wheel drive vehicles as well, axle differential mechanisms that are used to absorb the difference in rotation between the left and right wheels are installed on the front and rear wheels. Accordingly, in four-wheel drive vehicles of this type, a center differential mechanism and axle differential mechanisms for the front and rear wheels are required, so that a total of three differential mechanisms must be installed.

In cases where three differential mechanisms are thus separately installed, the power transmission system of the vehicle is increased in size, and the number of parts required is also increased, so that there is an increase in the cost of the vehicle. Accordingly, systems in which either the front or rear axle differential mechanism and the center differential mechanism are constructed as an integral unit have been proposed (for example) in Japanese Patent No. 2615086, Japanese Patent No. 3047016 and Japanese Patent No. 2621680. In the systems disclosed in these patents, the axle differential mechanism on the side of the front wheels and the center differential mechanism are constructed as an integral unit; accordingly, it is conceivable that the overall construction of the power transmission system could be reduced in size.

However, in the case of the system disclosed in Japanese Patent No. 2615086, the center differential mechanism is constructed with a pair of double planetary gears, and has a construction in which a bevel gear type axle differential mechanism is installed adjacent to this; accordingly, this system suffers from the problem of an extremely complicated and expensive construction. Furthermore, an integrated system is constructed by installing the bevel type axle differential mechanism inside a two-part casing that accommodates the center differential mechanism, and then connecting the two-part casing by means of bolts; as a result, the number of constituent parts required in the respective mechanisms is increased, and the number of places where shim adjustment is required is increased, so that the system is poor in terms of assembly characteristics. Moreover, a construction is used in which the system that is integrally constructed in this manner is supported by the transmission housing via a pair of left and right bearings so that rotation is possible; accordingly, the forces that act on the input gear members to the center differential mechanism and the output gears members to the rear wheel side must be supported by this pair of bearings, so that the bearing load is increased.

Furthermore, in the system disclosed in Japanese Patent No. 3047016, a hydraulic clutch that performs on-off operation of the center differential mechanism is installed, so that a portion of the system has a double-shift structure, thus resulting in a complicated overall structure. Moreover, the system disclosed in Japanese Patent No. 2621680 is constructed by installing two sets of planetary gear trains adjacent to each other; this system has a construction in which the rotational driving force from the engine is divided and transmitted to the left front wheel and the second planetary gear train by the first planetary gear train, and the rotational driving force that has thus been transmitted to the second planetary gear train is divided between the right front wheel and the rear wheels by the second planetary gear train. Accordingly, the gear ratios of these two sets of planetary gear trains with respect to the left and right front wheels must be set at the same value, so that the degree of freedom in design is low, and the setting of the gear ratios is difficult.

SUMMARY OF THE INVENTION

The present invention was devised in light of such problems. It is an object of the present invention to provide a simple and compact four-wheel drive system in which the center differential mechanism and either the front or rear axle differential mechanism are constructed as an integral unit.

In the present invention, in order to achieve such an object, a four-wheel drive system for vehicles is constructed with a center differential mechanism that divides and transmits a rotational driving force from a driving source (e.g., the engine E in the embodiment) to the front wheel side and rear wheel side, and an axle differential mechanism that divides and transmits the rotational driving force that has been divided by the abovementioned center differential mechanism to the left and right wheels on either the front wheel side or the rear wheel side. Furthermore, the center differential mechanism is constructed from a single pinion type first planetary gear device which has a first carrier member (e.g., the first carrier 13 in the embodiment) that is rotationally driven by the rotational driving force from the driving source, a first sun gear member (e.g., the first sun gear 11 in the embodiment) that is connected to the axle differential mechanism, and a first ring gear member (e.g., the first ring gear 14 in the embodiment) that is connected to the other of the two sides, i.e., either the front wheel side or rear wheel side, and the axle differential mechanism is constructed from a double pinion type second planetary gear device which has a second ring gear member (e.g., the second ring gear 24 in the embodiment) that is connected to the first sun gear member, a second sun gear member (e.g., the second sun gear 21 in the embodiment) that is connected to either the left or right wheel, and a second carrier member (e.g., the second carrier 23 in the embodiment) that is connected to the other of the two wheels, i.e., either the left or right wheel. These first and second planetary gear devices are installed adjacent to each other in a coaxial configuration.

In the four-wheel drive system constructed in this manner, the rotational driving force is divided and transmitted to the front wheel side and rear wheel side by the center differential mechanism, and the rotational force that has thus been divided is divided and transmitted to the left and right wheels by the [abovementioned] axle differential mechanism. Accordingly, the construction that divides and transmits the driving force is simple, and can easily be designed. Furthermore, since the single pinion type first planetary gear train that constitutes the center differential mechanism and the double pinion type second planetary gear train that constitutes the axle differential mechanism are disposed adjacent to each other in a coaxial configuration, the connecting structures of the respective elements can be simplified, and the overall construction can be made compact.

Furthermore, in another invention of the present application, a four-wheel drive system for vehicles is constructed with a center differential mechanism that divides and transmits a rotational driving force from a driving source (e.g., the engine E in the embodiment) to the front wheel side and the rear wheel side, and an axle differential mechanism that divides and transmits the rotational driving force divided by this center differential mechanism to the left and right wheels on either the front wheel side or rear wheel side. Furthermore, the center differential mechanism is constructed from a single pinion type first planetary gear device which has a first driven gear member (e.g., the output driven gear 3 in the embodiment) that is rotationally driven by the rotational driving force from the driving source, a first carrier member (e.g., the first carrier 13 in the embodiment) that is constructed as an integral unit with this driven gear member, a first sun gear member (e.g., the first sun gear 11 in the embodiment), a first ring gear member (e.g., the first ring gear 14 in the embodiment), and an output gear member (e.g., the rear wheel driving gear 15) that is formed as an integral part of the first ring gear member on the outer circumference of this first ring gear member, and that transmits the rotational driving force to the other of the two sides, i.e., the front wheel side or the rear wheel side, and the axle differential mechanism is constructed from a double pinion type second planetary gear device which has a second ring gear member (e.g., the second ring gear 24 in the embodiment) that is constructed as an integral unit with the first sun gear member, a second sung gear member (e.g., the second sun gear 21 in the embodiment) that is connected to either the abovementioned left wheel or the abovementioned right wheel, and a second carrier member (e.g., the second carrier 23 in the embodiment) that is connected to the other of the two wheels, i.e., either the left wheel or right wheel. Furthermore, a cylindrical retaining member is engaged and connected with the first carrier member that is constructed as an integral unit with the driven gear member, so that an input rotating member is constructed, and the second planetary gear device is disposed inside this input rotating member. Furthermore, the right end portion and left end portion of the input rotating member are supported rotatably by the housing via first and second bearings (e.g., the tapered roller bearings 61 and 62 in the embodiment). Moreover, an output rotating member which is constructed with an output gear member as an integral part on the outer circumference of the first ring gear member is supported rotatably at one end by the driven gear member via a third bearing (e.g., the ball bearing 64 in the embodiment), and is [likewise] supported rotatably at the other end by the housing via a fourth bearing (e.g., the ball bearing 63 in the embodiment).

In the four-wheel drive system constructed in this manner, the rotational driving force is divided and transmitted to the front wheel side and rear wheel side by the center differential mechanism, and the rotational driving force that has thus been divided is divided and transmitted t the left and right wheels by the axle differential mechanism. Accordingly, the construction that divides and transmits the driving force is simple, and can easily be designed. Furthermore, since the single pinion type first planetary gear train that constitutes the center differential mechanism and the double pinion type second planetary gear train that constitutes the axle differential mechanism are constructed with the respective elements connected as described above, the connecting structures can be simplified, and the overall construction can be made compact.

In the present invention, in particular, the second planetary gear device is disposed inside an input rotating member which is constructed by engaging and connecting a cylindrical retaining member with a first carrier member that is formed as an integral unit with the driven gear member, and this structure can be assembled by successively assembling the respective elements; furthermore, there is no need for bolts to connect the housing as in conventional systems, so that the assembled construction is simple.

Furthermore, the right end portion and left end portion of the input rotating member are supported rotatably by the housing via first and second bearings; accordingly, the force that acts on the driven gear member can be received by these first and second bearings. Meanwhile, the output rotating member which is constructed with an output gear member that is formed as an integral part of the first ring gear member on the outer circumference of the first ring gear member is supported rotatably at one end by the driven gear member via a third bearing, and is [likewise] supported rotatably at the other end by the housing via a fourth bearing; accordingly, the force that acts on the output gear member can be received by these third and fourth bearings, so that the forces that act on the driven gear member and output gear member can be dispersed and received by the first through fourth bearings, thus making it possible to lighten the load on these bearings.

Furthermore, in the present invention, a construction may be used in which the rotational driving force of the driving source is subjected to a speed change by the transmission, and is transmitted to the center differential mechanism via an output driving gear disposed on the output shaft of the transmission, and an output driven gear that engages with this output driving gear. In this case, the output driven gear is integrally connected to the first carrier member and disposed coaxially with this first carrier member, and a recess that opens to the side is formed on the internal diameter side of the gear body that has the output driven gear on its outer circumference. The first ring gear is supported by the output driven gear via a bearing member that is fitted and held in this recess, so that the first ring gear is free to rotate, and pinion accommodating spaces that can accommodate pinion gear members are formed in communication with the abovementioned recess in the output driven gear. Furthermore, shaft retaining holes that cut across these pinion accommodating spaces and extend in the axial direction through the left and right side walls that form the pinion accommodating spaces are formed in the output driven gear, and the first gear member is constructed by pinion shafts fitted in these shaft retaining holes.

Furthermore, the system is constructed so that outer-tooth pinion gears which are disposed on these pinion shafts so that these outer-tooth pinion gears are free to rotate, and which are positioned inside the pinion accommodating spaces, engage with the inner-tooth pinion gears of the first ring gear member.

In the planetary gear device constructed in this manner, the pinion gear members are supported so that these pinion gear members are free to rotate by pinion shafts inside the pinion accommodating spaces formed inside the output driven gear, so that the power transmission gear member that has the pinion accommodating spaces can function as a carrier member. Accordingly, there is no need to joint a carrier to the side surface of the output driven gear by welding or the like.

Furthermore, for example, the abovementioned output driven gear is manufactured by the lost-wax casting process from a material that has the high strength required in a gear part (chromium-molybdenum steel, chromium steel, carbon steel for machine structural use, nickel-chromium steel, nickel-chromium-molybdenum steel and the like).

As a result, an output driven gear which has the carrier constituent parts as integral parts can be constructed without welding, using a high-strength material of the type required in a gear member. Since welding is thus made unnecessary, there is no problem of the interference of welded parts with the pinion shafts or pinion gears, so that there is a high degree of freedom in the design of the carrier shape; furthermore, there is no need for an after-treatment process such as a welding strain removal treatment or the like. Moreover, since there is no need for a carrier assembly process or welding process, the number of assembly processes required can be reduced, and the number of constituent parts required is reduced so that the cost of parts can be reduced. Furthermore, since the carrier is also integrally formed from the high-strength material used for the output driven gear, the carrier constituent parts can be reduced in size, so that the construction of the planetary gear can be made more compact.

In particular, since the output driven gear requires a carbon impregnation treatment or the like, the carrier constituent parts that form an integral unit with this output driven gear are also simultaneously subjected to such a carbon impregnation treatment or the like, so that these parts have an extremely high strength. Furthermore, since these parts are manufactured by lost-wax casting, rounded parts (curved surface parts) can easily be formed in the connecting parts between the power transmission gear and the connecting arms that form the carrier; accordingly, the concentration of stress in these parts can be prevented, so that the carrier strength can be greatly increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

A preferred embodiment of the present invention will be described below with reference to the attached figures. A power transmission system which has a four-wheel drive system for vehicles constituting a preferred embodiment of the present invention is shown in model form in FIG. 1; this power transmission system will be described first. This power transmissions system is constructed so that the rotational driving force of an engine E is divided and transmitted to left and right front wheels 5a and 5b and left and right rear wheels 37a and 37b. The output of the engine E is subjected to a speed change in a transmission TM which has a torque converter, speed-change gears and the like, and is then transmitted from an output driving gear 2 connected to the transmission output shaft 1 to a power dividing apparatus DF that has the four-wheel drive system construction of the present invention. The power dividing apparatus DF has an output driven gear 3 that engages with the output driving gear 2, and further has a first planetary gear device 10 and a second planetary gear device 20 that are installed coaxially with this output driven gear 3.

Figure 1:
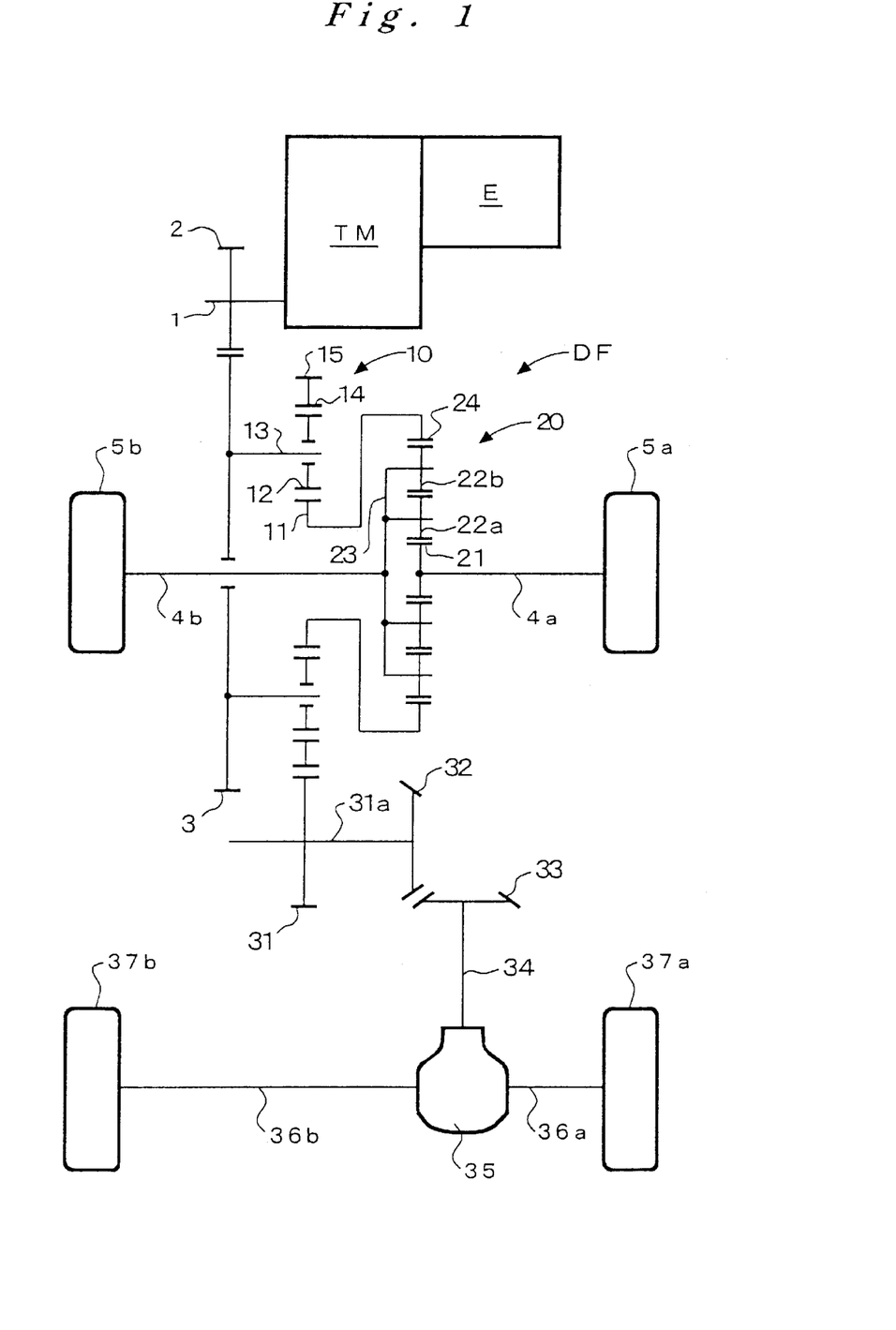
FIG. 1 is a schematic diagram which shows the construction of a power transmission system that has the four-wheel drive system for vehicles of the present invention.

The first planetary gear device 10 has a first sun gar 11 which is disposed coaxially with the output driven gear 3, a first carrier 13 which is disposed coaxially with the first sun gear 11 and which is connected to the output driven gear 3, a plurality of first pinion gears 12 which are held by the first carrier 13 so that these first pinion gears 12 are free to rotate, and which engage with the first sun gear 11 and revolve about the first sung gear 11, and a first ring gear 14 which has internal teeth that surround the outer circumferences of the first pinion gears 12, and which engages with the first pinion gears 12 and rotates coaxially with the first sun gear 11. As is seen from this construction, the first planetary gear device 10 is constructed from a single pinion type planetary gear mechanism. Furthermore, the first sun gear 11 is constructed as an integral unit with the second ring gear 24 of the second planetary gear device 20. Moreover, a rear wheel driving gear 15 which is used to transmit the driving force to the rear wheel side is formed as an integral unit with the first ring gear 14 on the outer circumference of the first ring gear 14.

The second planetary gear device 20 has a second sun gear 21 which is disposed coaxially with the output driven gear 3 and first sun gear 11, a second carrier 23 which is disposed coaxially with the second sun gear 21, a plurality of second inside pinion gears 22a which are held by the second carrier 23 so that these second inside pinion gears 22a are free to rotate, and which engage with the second sun gear 21 and revolve about the second sun gear 21, a plurality of second outside pinion gears 22b which are held by the second carrier 23 so that these second outside pinion gears are free to rotate, and which engage with the second inside pinion gears 22a and revolve together with these second inside pinion gears 22a, and a second ring gear 24 which has internal teeth that surround the outer circumferences of the second outside pinion gears 22b, and which engages with the second outside pinion gears 22b and rotates coaxially with the second sun gear 21. As is seen from this construction, the second planetary gear device 20 is constructed from a double pinion type planetary gear mechanism. Furthermore, as was described above, the second ring gear 24 is connected [to the first sun gear 11] by being constructed as an integral unit with the first sun gear 11. Moreover, the second sun gear 21 is linked to the right wheel 5a via a right axle shaft 4a, and the second carrier 23 is linked to the left wheel 5b via a left axle shaft 4b.

Meanwhile, the rear wheel driving gear 15 which is disposed on the outer circumference of the first ring gear 14 as an integral part of the first ring gear 14 engages with a rear wheel driving gear 31 formed on a rear wheel drive shaft 31a. A first bevel gear 32 is linked to the rear wheel drive shaft 31a, and a propeller shaft 34 is linked to a second bevel gear 33 that engages with this first bevel gear 32. The propeller shaft 34 is connected to a rear wheel side axle differential mechanism 35, and this rear wheel side axle differential mechanism 35 is connected to the left and right rear wheels 37a and 37b via left and right axle shafts 36a and 36b.

In the power transmission system constructed as described above, the output rotation of the engine E is subjected to a speed change in the transmission TM, and is transmitted to the output driven gear 3 from the output driving gear 2 that is connected to the transmission output shaft 1. The output driven gear 3 is connected to the first carrier 13 of the first planetary gear device 10, so that the rotational driving force transmitted to the output driven gear 3 is transmitted "as is" to the first carrier 13, and this force is divided and transmitted to the first sun gear 11 (engaged by the first pinion gears 12 that are supported by the first carrier 13 so that these first pinion gears 12 are free to rotate) and the first ring gear 14. As is seen from the above construction, the first sun gear 11 is connected to the front wheel side, and the first ring gear 14 is connected to the rear wheel side, so that the first planetary gear device 10 is used as a center differential mechanism.

First, the rotational driving force transmitted to the first sun gear 11 is transmitted "as is" to the second ring gear 24 that is integrally connected to this first sun gear 11, and this rotational driving force is then divided and transmitted to the second carrier 23 which supports the second outside pinion gears 22b (that engage with the second ring gear 24) and the second inside pinion gears 22a so that these pinion gears are free to rotate, and the second sun gear 21 with which the second inside pinion gears 22a engage. Then, the rotational driving force transmitted to the second carrier 23 is transmitted to the left front wheel 5b via the left axle shaft 4b, and the rotational driving force transmitted to the second sun gear 21 is transmitted to the left front wheel 5a via the axle shaft 4a, so that these left and right front wheels 5a and 5b are rotationally driven. As is seen from this construction, the second planetary gear device 20 is used as a front wheel side axle differential mechanism.

Meanwhile, the rotational driving force that is transmitted to the first ring gear 14 is transmitted from the rear wheel driving gear 15 that is formed on the outer circumference of the first ring gear 14 as an integral part of this first ring gear 14 to the rear wheel driven gear 31 that engages with this rear wheel driving gear 15, and is transmitted to the rear wheel side axle differential mechanism 35 via the rear wheel drive shaft 31a, first bevel gear 32, second bevel gear 33 and propeller shaft 34. Then, from the rear wheel side axle differential mechanism 35, this rotational driving force is divided between the left and right axle shafts 36a and 36b, and is transmitted to the left and right rear wheels 37a and 37b, so that the left and right rear wheels 37a and 37b are rotationally driven.

Figure 2:
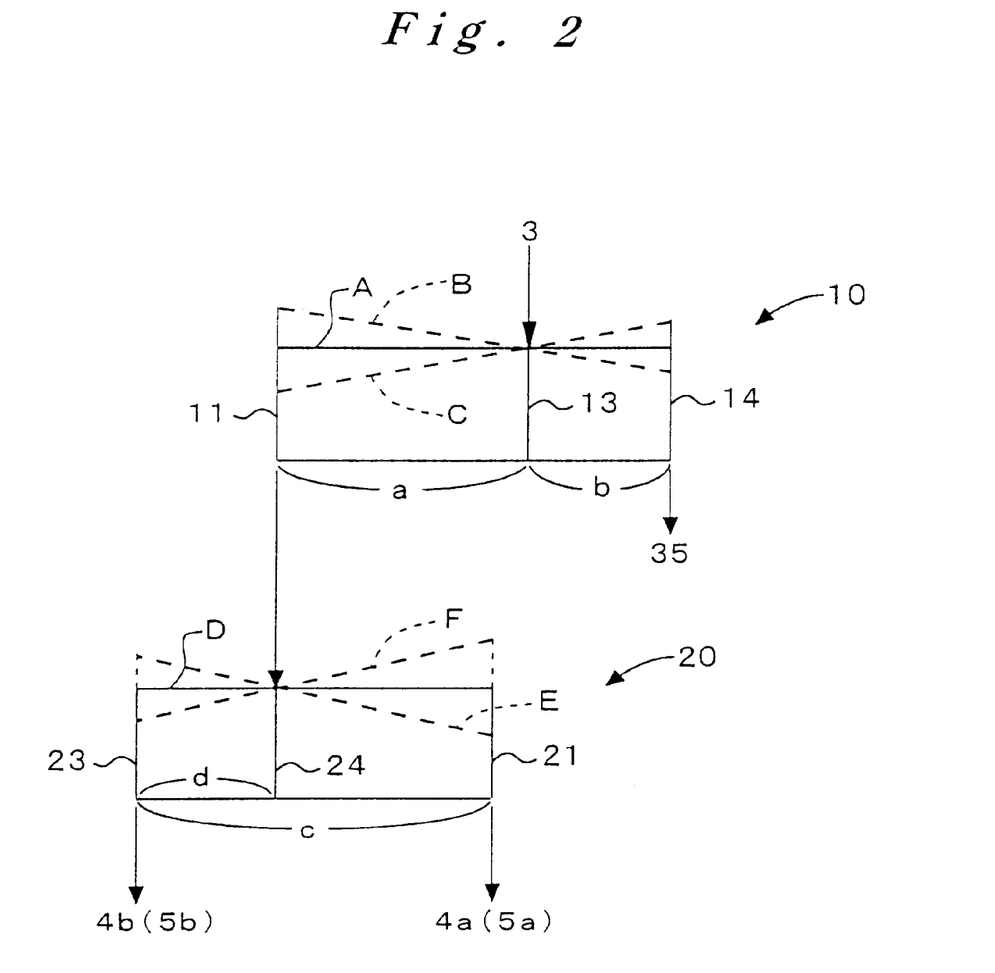
FIG. 2 is a velocity diagram which shows the relationship of the rotational velocities of the respective rotating elements in the first and second planetary gear devices that constitute the abovementioned four-wheel drive system.

The operation of the first planetary gear device 10 as a center differential mechanism in the above construct, and the operation of the second planetary gear device 20 as a front wheel axle differential mechanism, will be described with reference to the velocity diagram shown in FIG. 2. FIG. 2 shows the relationship of the rotational velocities of the first sung gear 11, first carrier 13 and first ring gear 14 in the first planetary gear device 10, and the relationship of the rotational velocities of the second sun gear 21, second carrier 23 and second ring gear 24 in the second planetary gear device 20.

In this velocity diagram, the rpm values of these respective rotating elements are expressed by length in the vertical direction, and the spacing intervals a, b, c and d of the respective elements in the horizontal direction are proportional to the reciprocals of the numbers of teeth of the sun gears and ring gears. The first planetary gear device 10 is a single pinion type device; accordingly, as is shown in the figures, the positional relationship of the respective elements is in the order (from the left) of first sun gear 11, first carrier 13, first ring gear 14, the spacing interval a in the horizontal direction between the vertical lines indicating the first sun gear 11 and first carrier 13 is 1/Ns1, and the spacing interval b in the horizontal direction between the vertical lines indicating the first carrier 13 and the first ring gear 14 is 1/Nr1. Furthermore, the second planetary gear device 20 is a double pinion type device; accordingly, as is shown in the figures, the positional relationship of the respective elements differs from that of the first planetary gear device 10, and is in the order (from the left) of second carrier 23, second ring gear 24, second sun gear 21. Here, the spacing interval c in the horizontal direction between the vertical lines indicating the second sun gear 21 and the second carrier 23 is 1/Ns2, and the spacing interval d in the horizontal direction between the vertical lines indicating the second carrier 23 and second ring gear 24 is 1/Nr2. Here, Ns1, Nr1, Ns2 and Nr2 respectively indicate the numbers of teeth of the first sun gear 11, first ring gear 12, second sun gear 21 and second ring gear 24.

In this velocity diagram, when the rotational driving force from the engine E is transmitted to the first carrier 13 from the output driven shaft 3, this rotational driving force is divided between the first sun gear 11 and the first ring gear 14, and is transmitted to the front wheel side and the rear wheel side. In this case, when the front wheels and rear wheels are rotationally driven at the same speed, the entire first planetary gear device 10 is caused to rotate as a unit, so that the front wheel side and rear wheel side are driven by the same rotation as indicated by the solid line A in the diagram. On the other hand, when (for example) the front wheel side is subjected to conditions that tend to cause slipping, so that the running load is reduced compared to the rear wheel side, the rotation of the first sun gear 11 connected to the front wheel side increases, and the rotation of the first ring gear 14 connected to the rear wheel side drops, as indicated by the broken line B. Conversely, when the rear wheel side is subjected to conditions that tend to cause slipping so that the running load is reduced compared to the front wheel side, the rotation of the first ring gear 14 connected to the rear wheel side increases, and the rotation of the first sun gear 11 connected to the front wheel side drops, as indicated by the broken line C. Thus, a center differential operation which divides and transmits the rotational driving force to the front wheel side and rear wheel side while allowing a difference in rotation between these two sides is accomplished.

The rotational driving force that is divided by the first planetary gear device 10 and transmitted to the first sun gear 11 as described above is transmitted to the second ring gear 24, which is formed as an integral unit with this first sun gear 11. The rotational driving force that has thus been transmitted to the second ring gear 24 is divided between the second sun gear 21 and second carrier 23 in the second planetary gear device 20, and is transmitted to the left and right front wheels. In this case, when the left and right front wheels are rotationally driven at the same speed without slipping, the entire second planetary gear device 20 is caused to rotate as a unit, so that the left and right front wheels are driven by the same rotation as indicated by the solid line D in the diagram. On the other hand, when (for example) the left front wheel 5b is subjected to conditions that tend to cause slipping so that the running load is reduced compared to the right front wheel 5a, the rotation of the second carrier 23 connected to the left front wheel 5b increases, and the rotation of the second sun gear 21 connected to the right front wheel 5a drops, as indicated by the broken line E. Conversely, when the running load on the right front wheel 5a is reduced, the rotation of the second sun gear 21 connected to the right front wheel 5a increases, and the rotation of the second carrier 23 connected to the left front wheel drops, as indicated by the broken line F. Thus, a front wheel side axle differential operation which divides and transmits the rotational driving force to the left and right front wheels while allowing a difference in rotation between these two wheels is accomplished.

Figure 3:
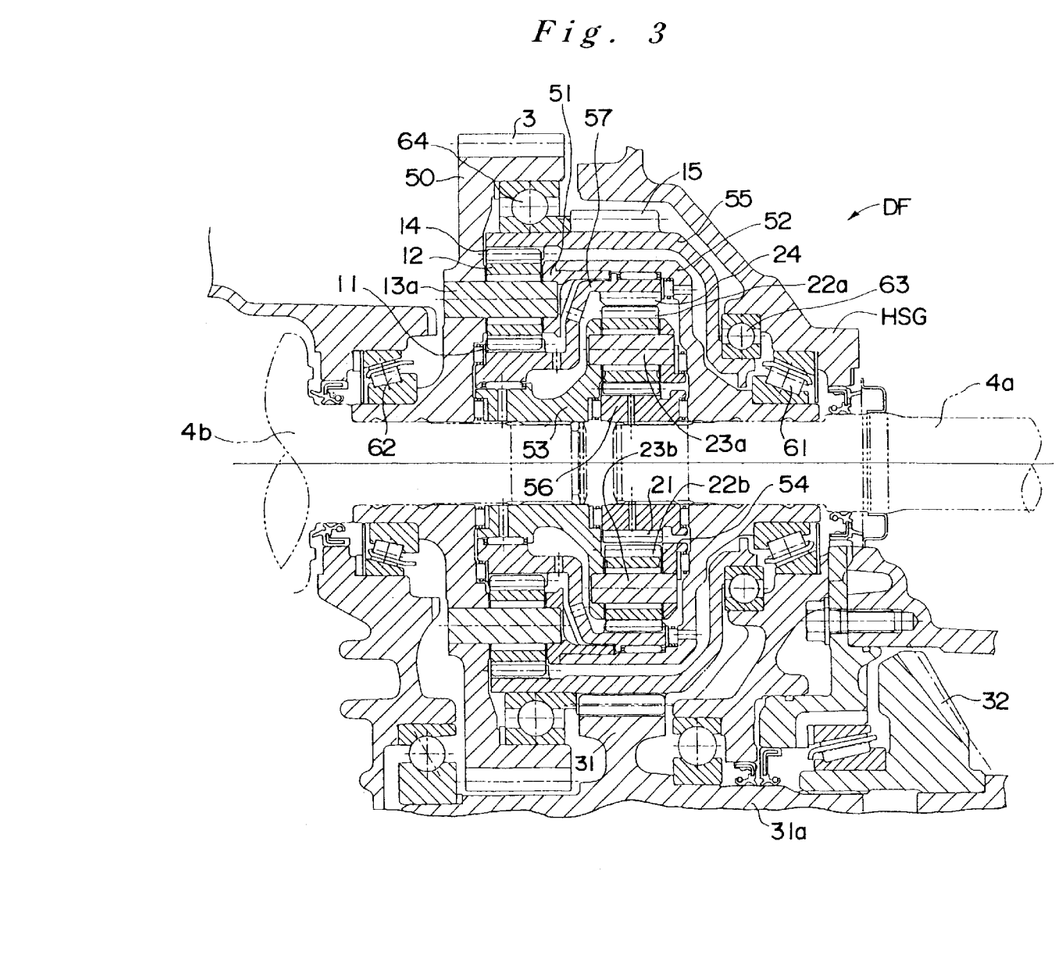
FIG. 3 is a sectional view which shows an example of the construction of the abovementioned four-wheel drive system.

Next, the concrete construction of the power dividing apparatus DF will be described with reference to FIG. 3. The power dividing apparatus DF is constructed by supporting the output driven gear 3 and the first and second planetary gear devices 10 and 20 inside the housing HSG by means of a pair of left and right tapered roller bearings 61 and 62 so that these parts are free to rotate. A left-side boss part 50e (see FIG. 5) on the output gear body 50 (which has the output driven gear 3 disposed on its outer circumferential part) is supported rotatably on the housing HSG by the left tapered roller bearing 62.

Figure 4:
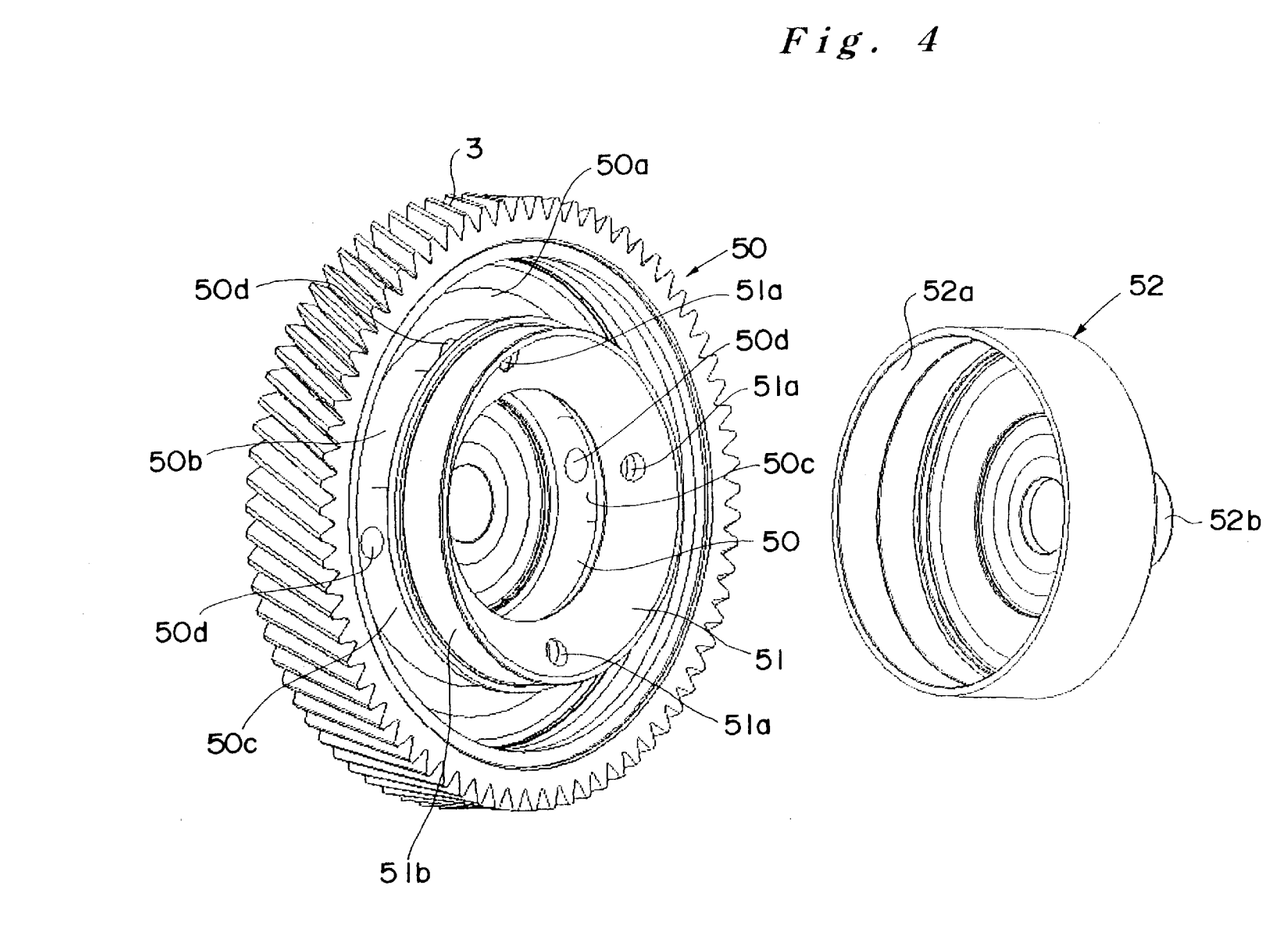
FIG. 4 is a perspective view which shows the output gear body that constitutes [a part of] the abovementioned four-wheel drive system, and the second retaining member that is engaged with this output gear body.
Figure 6A:
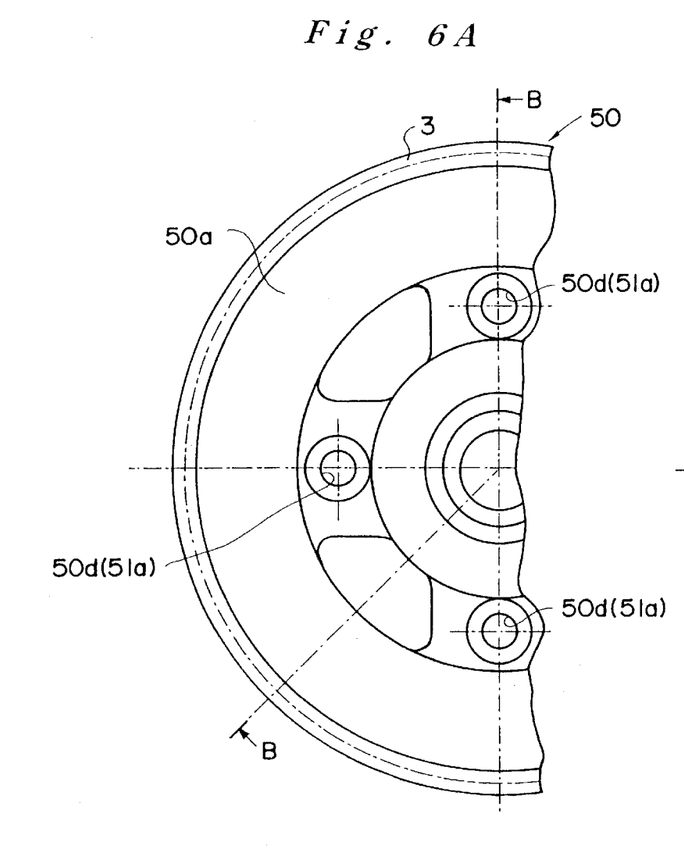
FIGS. 6A and 6B are a side view and a view along the arrow B—B which show the construction of the power transmission gear part that constitutes the planetary gear device of the present invention.
Figure 6B:
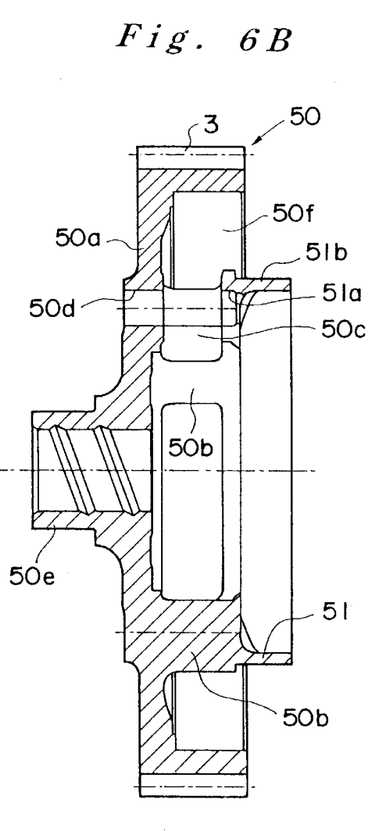

This output gear body 50 is shown in FIG. 4 and FIGS. 6A and 6B. The output gear body 50 has a wall surface 50a which has a recess 50f that opens to the right on the side the internal diameter of the output driven gear 3; a plurality of connecting arms 50b (located in four places in the present example) protrude rightward from this wall surface 50a, and a ring-form first retaining part 51 is integrally formed on the tip ends of these connecting arms 50b. Furthermore, pinion accommodating spaces 50c that are used to accommodate the first pinion gears 12 are formed between the four connecting arms 50b so that these spaces communicate with the recess 50f and are enclosed on both sides by the wall surface 50a and the first retaining part 51. Moreover, this output gear body 50 is manufactured by being molded using a lost-wax casting process.

Furthermore, this output gear body 50 is manufactured by being molded by a lost-wax casting process from a high-strength material used for gear construction. Since the output gear body is thus molded by lost-wax casting, the strength of the carrier as a whole can be increased by (for example) forming rounded parts (curved surface parts) in the connecting parts of the connecting arms 50b, wall surface 50a and first retaining part 51, so that the concentration of stress in these parts is prevented. Furthermore, since the output driven gear 3 is present as an integral unit on the outer circumferential side, the entire structure is subjected to a carbon impregnation treatment in order to ensure a sufficient gear strength. As a result, not only the gear section the output driven gear 2 but also the entire output gear body 50 are subjected to the carbon impregnation tratment, whereby a sufficient strength can be ensured in the carrier.

Pin press-fitting holes 50d and 51a which pass through the pinion accommodating spaces 50c and which are coaxially positioned are formed in the wall surface 50a and first retaining part 51 in four places. As is shown in the figures, the pin press-fitting holes 50d are formed so that these holes pass through the wall surface 50a, and the pin press-fitting holes 51a are formed as holes that stop in the first retaining part 51. First carrier pins 13a are press-fitted inside the pin press-fitting holes 50d and 51a from the side of the pin press-fitting holes 50d. In this case, the first carrier pins 13a are press-fitted with the first pinion gears 12 disposed inside the pinion accommodating spaces 50c, so that the first pinion gears 12 are supported on the first carrier pins 13a in a manner that allows the first pinion gears 12 to rotate (as shown in FIG. 3). As is seen from this construction, a first carrier 13 is constructed by the output gear body 50, the first carrier pins 13a and the first retaining part 51. In this case, the output gear body 50 and first retaining part 51 are formed as an integral unit by a lost-wax casting process using a high-strength material for use in gears, so that there is no need to weld the gear members as in a conventional system.

Figure 5:
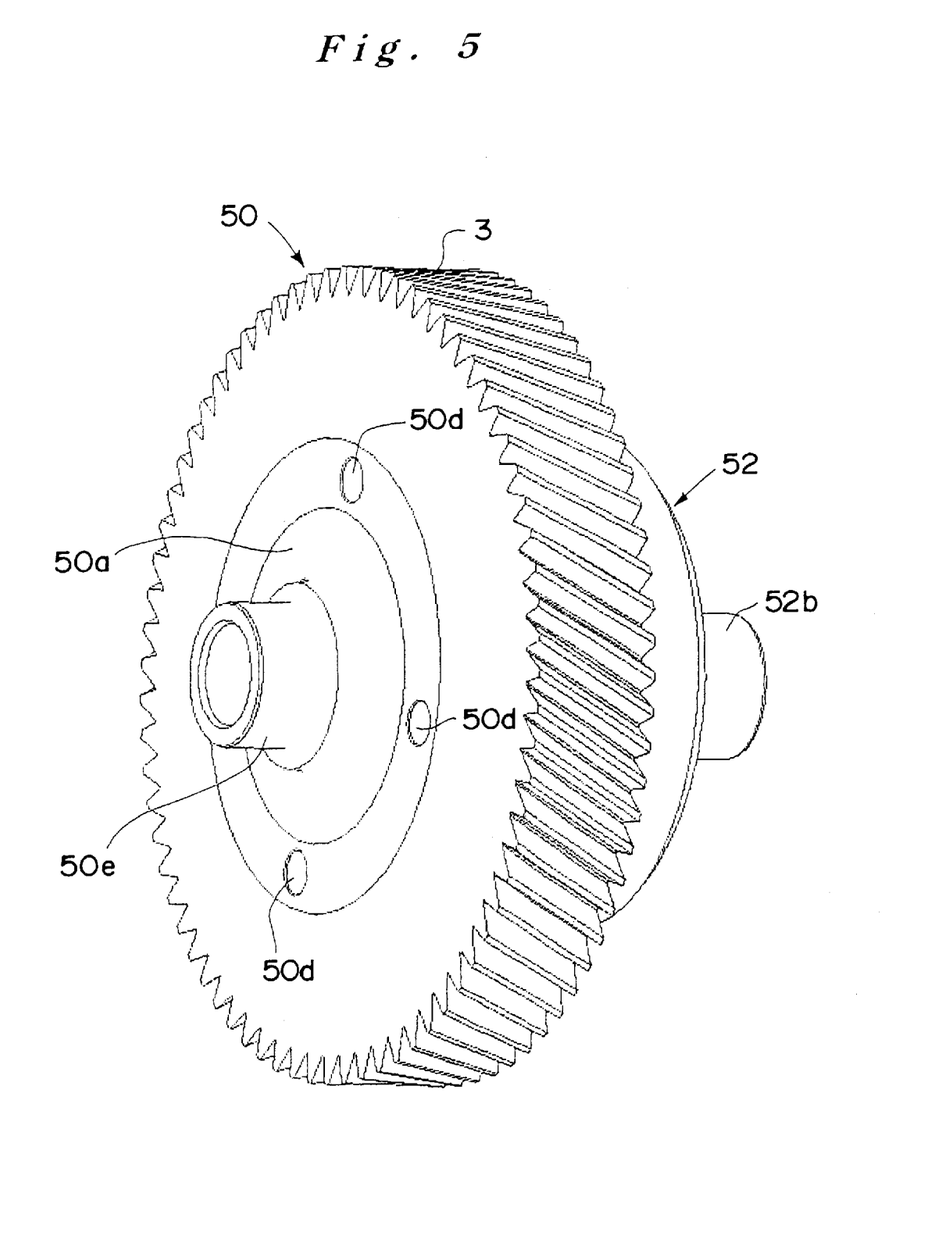
FIG. 5 is a perspective view showing a state in which the abovementioned output gear body and second retaining member are engaged.

The cylindrical second retaining member 52 shown in FIG. 4 is connected to the cylindrical outer circumferential surface 51b of the first retaining part 51. The second retaining member 52 is formed in a cylindrical shape that opens to the left, and the inner circumferential surface 52a of the left-side cylindrical part is engaged by press-fitting with the right-side outer circumferential surface 51b of the abovementioned first retaining part 51 so that these parts are formed into an integral unit, thus constructing an input rotating member as shown in FIG. 5. In the input rotating member that is thus constructed as an integral unit, the right end portion, i.e., the right end boss part 52b of the second retaining member 52 is supported rotatably on the housing HSG by the right tapered roller bearing 61. Thus, the output gear body 50, first carrier pins 13a, first retaining part 51 and second retaining member 52 are integrally connected so that an input rotating member is constructed; furthermore, this input rotating member is supported rotatably on the housing HSG by the left and right tapered roller bearings 61 and 62.

Meanwhile, a driving gear body 55 (this is also referred to as an "output rotating member") which has a first ring gear 14 on its inner circumference and a rear wheel driving gear 15 formed on its outer circumference is disposed on the outer circumferential side of the input driving member that is thus integrally connected and constructed. This driving gear body 55 is held in the left end outer circumferential portion by a ball bearing 64 which is fitted in the outer circumferential surface of the recess 50f and disposed inside the recess 50f of the output gear body 50 so that this driving gear body 55 is free to rotate, and is likewise held at the right end inner circumferential surface by a ball bearing 63 disposed inside the housing HSG so that this driving gear body 55 is free to rotate.

A through-hole which passes through in the axial direction is formed in the second retaining member 52 that is supported rotatably by the right tapered roller bearing 61, and the end portion of the right axle shaft 4a is fitted in this through-hole so that relative rotation is possible. A second sun gear body 56 on which the second sun gear 21 is formed is attached to the tip end of the right axle shaft 4a by a spline connection.

A through-hole which passes through in the axial direction is formed in the output gear body 50 that is supported rotatably by the left tapered roller bearing 62, and the end portion of the left axle shaft 4b is fitted in this through-hole so that relative rotation is possible. A third retaining member 53 which constitutes the second carrier 23 is spline-connected to the tip end of this left axle shaft 4b. Second inside carrier pins 23a that support the second inside pinion gears 22a so that these second inside pinion gears 22a are free to rotate, and second outside carrier pins 23b that support the second outside pinion gears 22b so that these second outside pinion gears 22b are free to rotate, are attached to the third retaining member 53 by press-fitting. A fourth retaining part 54 is integrally formed on the opposite side (in the axial direction) of these second inside and second outside carrier pins 23a and 23b, and a second carrier 23 is constructed from the third retaining member 53, second inside and second outside carrier pins 23a and 23b, and fourth retaining part 54. Furthermore, a connecting gear member 57 which has the first sun gear 11 and second ring gear 24 as integral parts is disposed on the outer circumferential surface of the third retaining member 53 so that this connecting gear member 57 is free to rotate.

As is seen from the above construction, a torque and axial force that act on the output driven gear 3 are applied to the output gear body 50 from the side of the engine. Since this torque is transmitted from the first carrier pins 13a to the first sun gear 11 and first ring gear 14 via the first pinion gears 12, the reactive force acts on the first carrier pins 13a. Furthermore, in a case where the first sun gear 11, first pinion gears 12 and first ring gear 14 are constructed from helical gears, the thrust force acts on the output gear body 50 that supports the first carrier pins 13a. Accordingly, in this power dividing apparatus DF, strength is required in the gear body 50, and especially in the parts that support the first carrier pins 13a, e.g., the connecting arms 50b. However, since the strength of the output gear body 50 is increased as described above, there are no problems in terms of strength.

Thus, a planetary gear device is constructed in which pinion accommodating spaces that can accommodate the pinion gear members are formed so that these spaces communicate with a recess formed on the internal diameter side of the gear part of the power transmission gear member, shaft retaining holes which cut across the these pinion accommodating spaces and extend in the axial direction through the left and right side walls that form the pinion accommodating spaces are formed in the power transmission gear member, and pinion gear members are supported by pinion shafts that are fitted in the shaft retaining holes, so that the power transmission gear member that has the pinion accommodating spaces can function as a carrier member.

Accordingly, a power transmission gear member which has the carrier constituent parts as integral parts can be constructed using a high-strength material of the type required in a gear member, without any need to join the carrier to the side surface of the power transmission gear member by welding or the like as in conventional system. Since there is thus no need for welding, there is no problem of interference between welded parts and the pinion shafts or pinion gears, so that there is a high degree of freedom in the design of the carrier shape; furthermore, there is no need for an after-treatment process such as a welding strain removal treatment or the like. Moreover, since there is no need for a carrier assembly process or welding process, the number of assembly processes required can be reduced, and the number of constituent parts required is reduced so that the cost of parts can be reduced.

Furthermore, since the carrier is also integrally formed from the high-strength material used for the output driven gear, the carrier constituent parts can be reduced in size, so that the construction of the planetary gear can be made more compact. In particular, since the output driven gear requires a carbon impregnation treatment or the like, the carrier constituent parts that form an integral unit with this output driven gear are also simultaneously subjected to such a carbon impregnation treatment or the like, so that these parts have an extremely high strength. Furthermore, since these parts are manufactured by lost-wax casting, rounded parts (curved surface parts) can easily be formed in the connecting parts between the power transmission gear and the connecting arms that form the carrier.

When the power dividing apparatus DF constructed as described above is to be assembled, the first carrier pins 13a are first press-fitted inside the pin press-fitting holes 50d and 51a in a state in which the first pinion gears 12 are disposed inside the pinion accommodating spaces 50c of the output gear body 50, thus producing a state in which the pinion gears 12 are supported on the first carrier pins 13a inside the pinion accommodating spaces 50c so that these pinion gears 12 are free to rotate. Then, the connecting gear member 57 which has the first sun gear 11 and second ring gear 24 as integral parts is installed inside the recess of the output gear body 50, and the first sung gear 11 and first pinion gears 12 are caused to engage. Furthermore, the third retaining member 53, which is in a state in which the second inside pinion gears 22a are held by the second inside carrier pins 23a so that these pinion gears 22a are free to rotate, and the second outside pinion gears 22b are held by the second outside carrier pins 23b so that these pinion gears 22b are free to rotate, is installed inside the recess of the output gear body 50 from the left side. As a result, the second outside pinion gears 22b engage with the second ring gear 24. Furthermore, the second sun gear body 56 is installed from the left side, so that the second sung gear 21 is caused to engage with the second inside pinion gears 22a.

Then, in a state in which the connecting gear member 57, third retaining member 53 and second sung gear body 56 are disposed in the recess of the output gear body 50 as described above, the cylindrical second retaining member 52 is attached by being press-fitted and engages with the first retaining member 51 of the output gear body 50 so that the abovementioned parts are covered. As a result, the input rotating member is assembled in a state in which the second planetary gear device 20 is accommodated inside.

Then, the driving gear body (output rotating member) 55 is attached at the left end on the outer circumferential side of the abovementioned input rotating member by being supported rotatably on the output gear body 50 via the ball bearing 64. Furthermore, the assembly of the power dividing apparatus DF is completed by supporting the device that has thus been assembled on the housing HSG by means of the ball bearing 63 and left and right tapered roller bearings 61 and 62 so that this device is free to rotate.

As was described above, the abovementioned power dividing apparatus DF has a construction which requires only the work of assembling the respective constituent parts in order, and the work of press-fitting the second retaining member in the first retaining part 51 of the output gear body 50; there is no need for bolt connection of the casing as in conventional devices, so that the assembly work is simple. Furthermore, since it is sufficient if the constituent parts are thus assembled by superimposing the parts in order in the axial direction, shim adjustment to adjust the cumulative error that occurs in the stacked state can be performed at the end of the assembly process; furthermore, the number of places requiring shim adjustment is small, and the disassembly work is simple.

Furthermore, in the abovementioned power dividing apparatus DF, a construction is used in which an input rotating member constructed by integrally connecting the output gear body 50, first carrier pins 13*a*, first retaining part 51 and second retaining member 52 is supported rotatably at the left and right ends on the housing HSG via tapered roller bearings 61 and 62; accordingly, the radial force and thrust force that act when the rotational driving force from the engine E is transmitted to the output driven gear 3 are received by these tapered roller bearings 61 and 62. Meanwhile, when the rotational driving force is divided by the first planetary gear device 10 that constitutes the center differential mechanism, and is transmitted to the rear wheel side from the rear wheel driving gear 15, the radial force and thrust force that act on the output rotating member (driving gear body 55) are received by the ball bearings 63 and 64. Thus, since the forces that act on the input rotating member and the forces that act on the output rotating member are respectively supported by different bearings, the loads on the respective bearings can be reduced, so that the required strength of the housing HSG that supports these bearings can be reduced.

Figure 7:
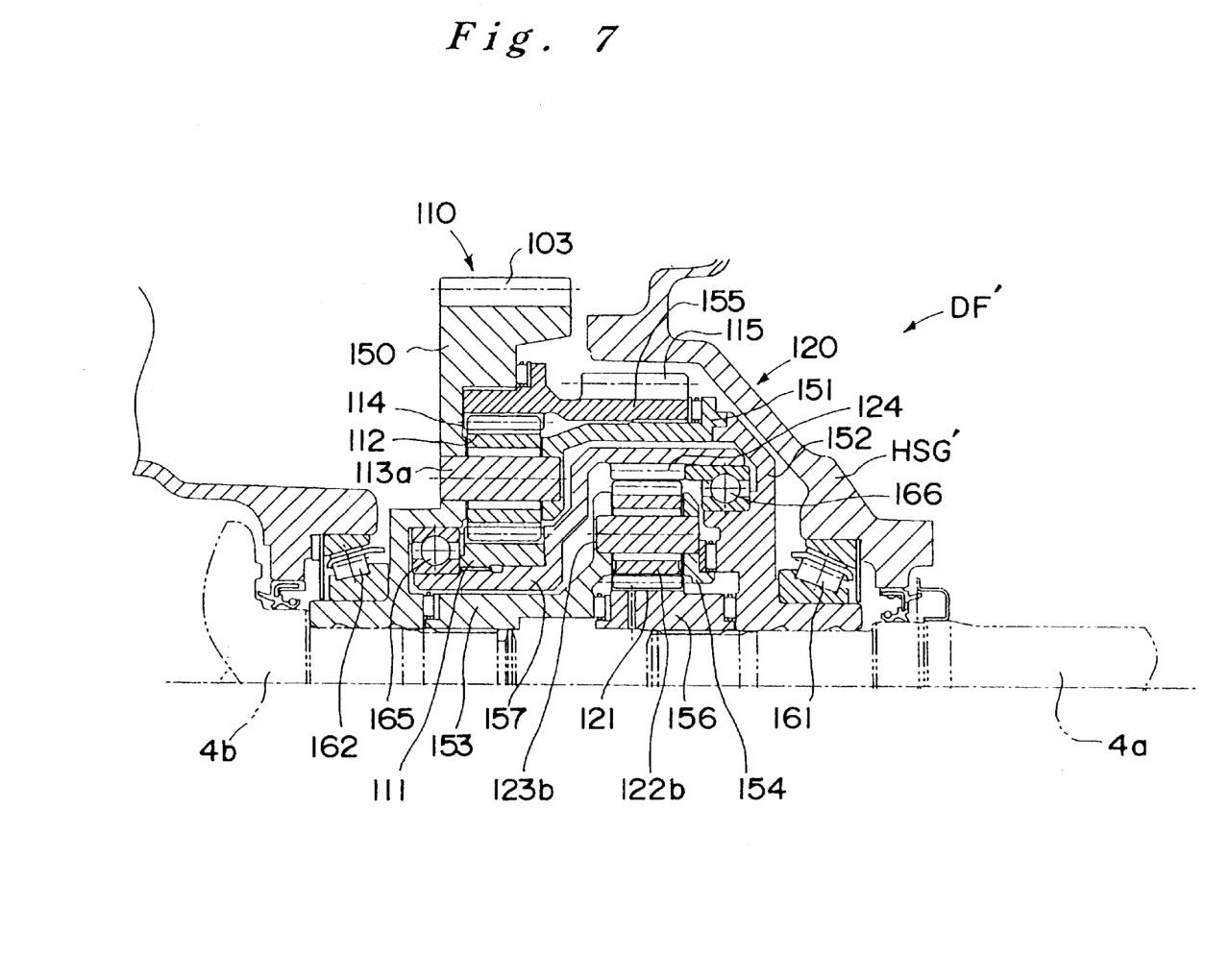
FIG. 7 is a sectional view which shows another example of the construction of the abovementioned four-wheel drive system.

Next, a different example of the construction of the power transmission system will be described with reference to FIG. 7. Furthermore, this power transmission system DF' also has the power transmission path construction shown in FIGS. 1 and 2; parts that correspond to the constructions shown in FIGS. 1 through 3 are indicated by numbers obtained by adding 100 to the numbers shown in FIGS. 1 through 3, and duplicate descriptions of members with the same function are omitted.

The power dividing apparatus DF' is constructed by supporting an output driving gear 103 and first and second planetary gear devices 110 and 120 inside the housing HSG' by means of a pair of left and right tapered roller bearings 161 and 162 so that these parts are free to rotate. An output gear body 150 which has the output driving gear 103 on its outer circumferential part is supported rotatably on the housing HSG' by means of the left tapered roller bearing 162. A plurality of first carrier pins 113*a* are attached to this output gear body 150 by press-fitting, and first pinion gears 112 are supported on these first carrier pins 113*a* so that these first pinion gears 112 are free to rotate. A first retaining part 151 is integrally formed on the opposite side (in the axial direction) of the first carrier pins 113*a*, and a first carrier 113 is constructed by the output gear body 150, first carrier pins 113*a* and first retaining part 151. Furthermore, a second retaining member 152 is connected to the first retaining part 151, and the end portion of this second retaining member 152 is supported rotatably on the housing HSG' by means of the right tapered roller bearing 161.

A driving gear body 155 which has a first ring gear 114 on its inner circumference and a rear wheel driving gear 115 formed on its outer circumference is disposed on the outer circumferential side of the output gear body 150, first carrier pins 113*a*, first retaining part 151 and second retaining member 152 that are thus integrally connected. This driving gear body 155 is held rotatably at the left end by the output gear body 150, and is likewise held rotatably at the right end by the abovementioned first retaining part 151.

A through-hole which passes through in the axial direction is formed in the second retaining member 152 that is supported rotatably by the right tapered roller bearing 161, and the end portion of the right axle shaft 4*a* is fitted in this through-hole so that relative rotation is possible. A second sun gear body 156 on which a second sun gear 121 is formed is attached to the tip end of the right axle shaft 4*a* by a spline connection.

A through-hole which passes through in the axial direction is formed in the output gear body 150 that is supported rotatably by the left tapered roller bearing 162, and the end portion of the left axle shaft 4*b* is fitted in this through-hole so that relative rotation is possible. A third retaining member 153 that constitutes a second carrier 123 is spline-connected to the tip end of this left axle shaft 4*b*. Second inside carrier pins 123*a* (not shown in the figures) which support second inside pinion gears 122*a* so that these second inside pinion gears 122*a* are free to rotate, and second outside carrier pins 123*b* which support second outside pinion gears 122*b* so that these second outside pinion gears 122*b* are free to rotate, are attached to the third retaining member 153 by press-fitting. A fourth retaining part 154 is integrally formed on the opposite side (in the axial direction) of these second inside and second outside carrier pins 123*a* and 123*b*, and a second carrier 123 is constructed from the third retaining member 153, second inside and second outside carrier pins 123*a* and 123*b*, and fourth retaining part 154.

Furthermore, a connecting gear member 157 which has a first sun gear 111 spline-connected to the outer circumferential surface on the left end portion, and which has a second ring gear 124 as an integral part on the inner circumference at the right end, is supported rotatably at the left end on the output gear body 150 via a ball bearing 165, and is likewise supported rotatably at the right end on the second retaining member 152 via a ball bearing 166.

In the present invention, as was described above, a single pinion type first planetary gear device that constitutes a center differential mechanism, and a double pinion type second planetary gear device that constitutes an axle differential mechanism, are disposed adjacent to each other in a coaxial configuration so that a four-wheel drive system is constructed. In this construction, the rotational driving force is divided and transmitted to the front wheel side and rear wheel side by the center differential mechanism, and the rotational driving force that has thus been divided is divided and transmitted to the left and right wheels by the axle differential mechanism. Accordingly, the construction that divides and transmits the driving force is simple, and can easily be designed. Furthermore, since the single pinion type first planetary gear train that constitutes the center differential mechanism and the double pinion type second planetary gear train that constitutes the axle differential mechanism are disposed adjacent to each other in a coaxial configuration, the connecting structures of the respective elements can be simplified, and the overall construction can be made compact.

Furthermore, in another invention of the present application, a center differential mechanism is constructed from a single pinion type first planetary gear device which has a driven gear member, a first carrier member that is constructed as an integral unit with this driven gear member, a first sun gear member, a first ring gear member and an output gear member which is formed as an integral part of this first ring gear member on the outer circumference of this first ring gear member, and an axle differential mechanism is constructed from a double pinion type second planetary gear device which has a second ring, gear member that is constructed as an integral unit with the first sun gear member, a second sun gear member that is connected to either the left or right wheel, and a second carrier member that is connected to the other of the two wheels, i.e., either the left or right wheel.

Furthermore, the second planetary gear device is disposed inside an input rotating member which is constructed by engaging and connecting a cylindrical retaining member with a first carrier member that is formed as an integral unit with the driven gear member, and the left end portion and right end portion of the of the input rotating member are supported rotatably on the housing via first and second bearings. Moreover, an output rotating member which is constructed with an output gear member as an integral part on the outer circumference of the first ring gear member is supported rotatably at one end by the driven gear member via a third bearing, and is [likewise] supported rotatably at the other end by the housing via a fourth bearing. Accordingly, the rotational driving force can be divided and transmitted to the front wheel side and rear wheel side by the center differential mechanism, and the rotational driving force that has thus been divided can be divided and transmitted to the left and right wheels by the axle differential mechanism, so that the mechanism that divides and transmits the driving force is simple, and can easily be designed. Furthermore, since the single pinion type first planetary gear train that constitutes the center differential mechanism and the double pinion type second planetary gear train that constitutes the axle differential mechanism are constructed by connecting respective elements as described above, the connecting structures can be simplified, and the overall construction can be made compact.

In the present invention, in particular, the second planetary gear device is disposed inside an input rotating member which is constructed by engaging and connecting a cylindrical retaining member with a first carrier member that is formed as an integral unit with the driven gear member, and this structure can be assembled by successively assembling the respective elements; furthermore, the number of places requiring shim adjustment is reduced, and there is no need for bolts to connect the housing as in conventional systems, so that the assembled construction is simple. Moreover, the forces that act on the driven gear member can be received by the abovementioned first and second bearings, and the forces that act on the output gear member can be received by the abovementioned third and fourth bearings; accordingly, the forces that act on the driven gear member and output gear member can be dispersed and received by the first through fourth bearings, so that the loads on these bearings can be alleviated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-234972 filed on Aug. 2, 2001, Japanese Patent Application No.2001-235462 filed on Aug. 2, 2001 and Japanese Patent Application No.2001-361928 filed on Nov. 28, 2001, which are incorporated herein by reference.

What is claimed is:

1. A four-wheel drive system for vehicles having a center differential mechanism that divides and transmits a rotational driving force from a driving source to the front wheel side and rear wheel side, and an axle differential mechanism that, divides and transmits the rotational driving force that has been divided by said center differential mechanism to the left and right wheels on either said front wheel side or said rear wheel side, wherein said center differential mechanism is constructed from a single pinion first planetary gear device which has a first carrier member that is rotationally driven by the rotational driving force from said driving source, a first sun gear member that is connected to said axle differential mechanism, and a first ring gear member that is connected to the other of the two sides, i.e., either said front wheel side or said rear wheel side;

said axle differential mechanism is constructed from a double pinion second planetary gear device which has a second ring gear member that is connected to said first sun gear member, a second sun gear member that is connected to either said left wheel or said right wheel, and a second carrier member that is connected to the other of the two wheels, i.e., either said left wheel or said right wheel;

and said first and second planetary gear devices are disposed adjacent to each other in a coaxial configuration.

2. The four-wheel drive system for vehicles according to claim 1, wherein the rotational driving force from said driving source is subjected to a speed change by means of a transmission, and is transmitted to said center differential mechanism via an output driving gear that is disposed on the transmission output shaft and an output driven gear that engages with this output driving gear, and said output driven gear is integrally connected with said first carrier member and disposed coaxially with said first carrier member.

3. The four-wheel drive system for vehicles according to claim 2, wherein a recess that opens to the side is formed on the internal diameter side of a gear body that has said output driven gear on its outer circumference, and said first sun gear member and said first carrier member are disposed inside said recess.

4. The four-wheel drive system for vehicles according to claim 2, wherein a recess that opens to the side is formed on the internal diameter side of the gear body that has said output driven gear on its outer circumference;

said first ring gear is supported by said output driven gear via bearing members that are fitted and held in said recess so that said first ring gear is free to rotate;

pinion accommodating spaces that can accommodate said pinion gear members are formed in said output driven gear so that these pinion accommodating spaces communicate with said recess;

shaft retaining holes that cut across said pinion accommodating spaces and extend in the axial direction through the left and right side walls that form said pinion accommodating spaces are formed in said output driven gear;

and said first carrier member is constructed by pinion shafts that are fitted in said shaft retaining holes.

5. The four-wheel drive system for vehicles according to claim 4, wherein outer-tooth pinion gears that are supported rotatably on said pinion shafts, and that are positioned inside said pinion accommodating spaces, are constructed so that these outer-tooth pinion gears mesh with the inner-tooth pinion gears of said first ring gear member.

6. The four-wheel drive system for vehicles according to claim 4, wherein said output driven gear is manufactured from a high-strength material by a lost-wax casting process.

7. The four-wheel drive system for vehicles according to claim 6, wherein said high-strength material is either chromium-molybdenum steel, chromium steel, carbon steel for machine structural use, nickel-chromium steel or nickel-chromium-molybdenum steel.

8. The four-wheel drive system for vehicles according to claim 1, wherein a wheel driving gear is integrally formed on the outer circumference of said first ring gear, and the rotational driving force is divided and transmitted to the other of the two sides, i.e., either said front wheel side or said rear wheel side, via said wheel driving gear.

9. The four-wheel drive system for vehicles according to claim 1, wherein said first sun gear member is integrally connect to said second ring gear member by a connecting gear member.

10. A four-wheel drive system for vehicles which is constructed by disposing a center differential mechanism that divides and transmits a rotational driving force from a driving source to the front wheel side and rear wheel side, and an axle differential mechanism that divides and transmits the rotational driving force that has been divided by said center differential mechanism to the left and right wheels on either said front wheel side or said rear wheel side, inside a housing, wherein said center differential mechanism is constructed from a single pinion first planetary gear device which has a driven gear member that is rotationally driven by the rotational driving force from said driving source, a first carrier member that is constructed as an integral unit with this driven gear member, a fist sun gear member, a first ring gear member, and an output gear member that is formed as an integral part of said first ring gear member on the outer circumference of said first ring gear member, and that is used to transmit the rotational driving force to the other of the two sides, i.e., either said front wheel side or said rear wheel side;

said axle differential mechanism is constructed from a double pinion second planetary gear device which has a second ring gear member that is constructed as an integral unit with said first sun gear member, a second sun gear member that is connected to either said left wheel or said right wheel, and a second carrier member that is connected to the other of the two wheels, i.e., either said left wheel or said right wheel;

an input rotating member is constructed by engaging and connecting a cylindrical retaining member with said first carrier member that is constructed as an integral unit with said driven gear member, and said second planetary gear device is disposed inside said input rotating member;

the right end portion and left and portion of said input rotating member are supported rotatably on said housing via first and second bearings;

an output rotating member which is constructed with said output gear member as an integral part on the outer circumference of said first ring gear member is supported rotatably at one end by the driven gear member via a third bearing, and is supported rotatably at the other end by the housing via a fourth bearing.

11. The four-wheel drive system for vehicles according to claim 10, wherein a recess that opens to the side is formed on the internal diameter side of said output driven gear, a plurality of connecting arms that protrude to the side are disposed inside this recess, a ring-form retaining part is integrally formed on the tip ends of these connecting arms, and a plurality of pinion accommodating spaces in which said first pinion gear members are disposed are formed between said plurality of connecting arms.

12. The four-wheel drive system for vehicles according to claim 11, wherein said output driven gear is manufactured by molding a high-strength material using a lost-wax casting process.

13. The four-wheel drive system for vehicles according to claim 12, wherein said high-strength material is either chromium-molybdenum steel, chromium steel, carbon steel for machine structural use, nickel-chromium steel or nickel-chromium-molybdenum steel.

14. The four-wheel drive system for vehicles according to claim 11, wherein pin press-fitting holes that pass through the wall surface in which said recess is formed, and through said retaining part, are formed inside said pinion accommodating spaces in said output driven gear so that these holes extend in the axial direction, first carrier pins are press-fitted in said pin press-fitting holes, and first pinion gears are supported rotatably on said carrier pins.

15. The four-wheel drive system for vehicles according to claim 11, wherein said input rotation member is constructed by engaging and connecting said cylindrical retaining member on the cylindrical outer circumferential surface of said retaining part.

16. The four-wheel drive system for vehicles according to claim 10, wherein said output rotating member which has said first ring gear member on its inner circumference and which has said output gear member on its outer circumference is positioned on the outer circumferential side of said input rotating member.

* * * * *